(12) United States Patent
Wang

(10) Patent No.: US 9,254,969 B2
(45) Date of Patent: Feb. 9, 2016

(54) TRANSPORTING DEVICE

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventor: Qiang-Wei Wang, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 60 days.

(21) Appl. No.: 14/138,310

(22) Filed: Dec. 23, 2013

(65) Prior Publication Data
US 2014/0178168 A1    Jun. 26, 2014

(30) Foreign Application Priority Data
Dec. 26, 2012    (CN) ..................... 2012 2 07277948 U

(51) Int. Cl.
B65G 47/90    (2006.01)
B65G 21/20    (2006.01)
B65G 47/91    (2006.01)

(52) U.S. Cl.
CPC .......... *B65G 47/907* (2013.01); *B65G 21/2027* (2013.01); *B65G 47/91* (2013.01)

(58) Field of Classification Search
CPC ..................................................... B65G 47/901
See application file for complete search history.

(56) References Cited

U.S. PATENT DOCUMENTS

2004/0231480 A1*  11/2004  Wattles et al. .................. 83/401
2014/0056670 A1*   2/2014  Gebhard ................. 414/225.01

\* cited by examiner

*Primary Examiner* — Ernesto Suarez
*Assistant Examiner* — Ronald Jarrett
(74) *Attorney, Agent, or Firm* — Novak Druce Connolly Bove + Quigg LLP

(57) ABSTRACT

A transporting device includes a support frame, a driving mechanism, a first picking mechanism, and a second picking mechanism. The driving mechanism is mounted on the support frame. The first picking mechanism includes a first sliding member slidably mounted on the support frame and driven by the driving mechanism, a first driving member mounted on the first sliding member, a hinge member comprising a hinge portion driven by the first driving member, a first connection portion rotatably connected to the hinge portion, and a second connection portion rotatably connected to the first connection portion. The second driving member includes a driving portion capable of telescoping and selectively latching with the second connection portion. Thus, the first connection portion and the first picking member are rotatable relative to the second connection portion.

9 Claims, 6 Drawing Sheets

TRANSPORTING DEVICE

BACKGROUND

1. Technical Field

The present disclosure generally relates to transporting devices, and particularly to a transporting device capable of loading and unloading workpieces.

2. Description of Related Art

Transporting devices include a support frame, a driving mechanism mounted on the support frame, a first picking mechanism, and a second picking mechanism. The first picking mechanism and the second picking mechanism are movably mounted on the support frame and driven by the driving mechanism. The first picking mechanism and the second picking mechanism move toward each other so that workpieces can be loaded and unloaded simultaneously. However, the workpiece picked up by the first picking mechanism may collide with a workpiece picked up by the second picking mechanism.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
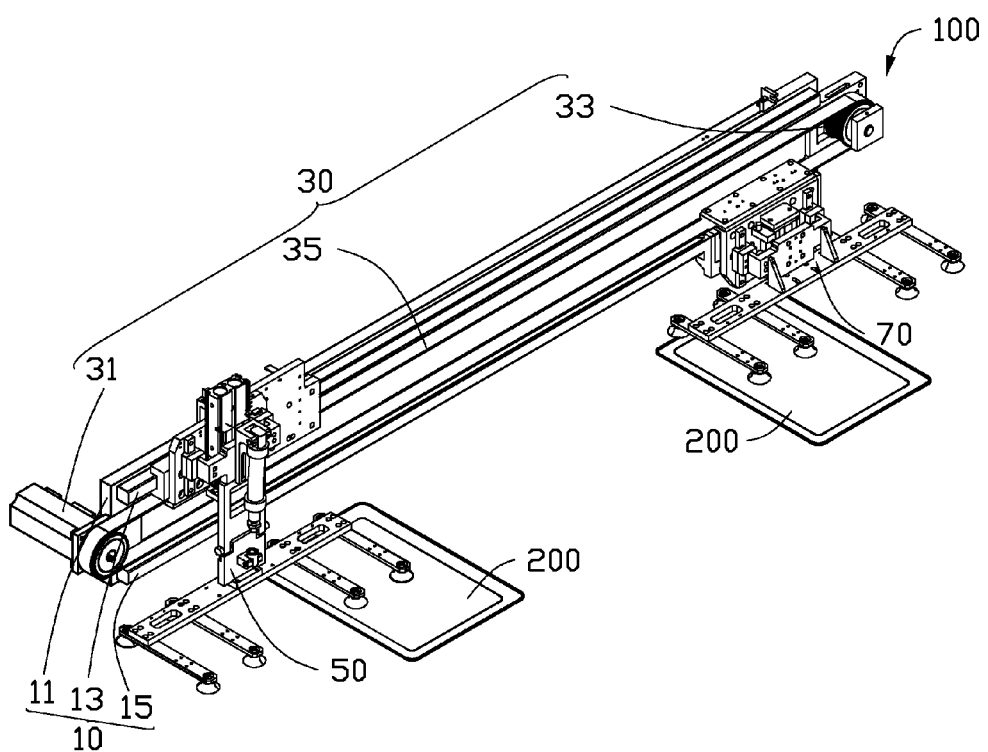
FIG. 1 shows one embodiment of a transporting device in use.
Figure 2:
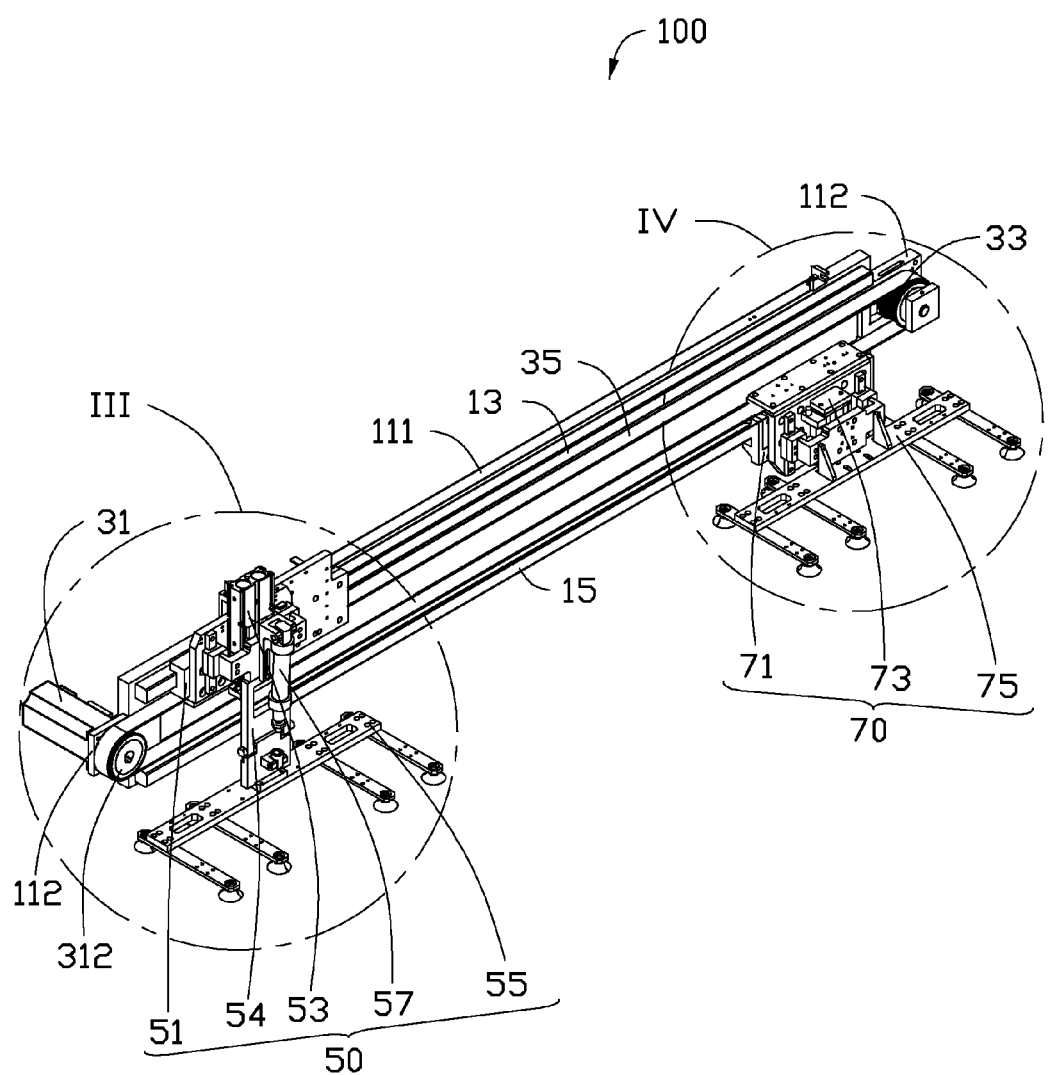
FIG. 2 shows an assembled, isometric view of the transporting device of FIG. 1.

FIGS. 1 and 2 show an embodiment of a transporting device 100, which is applied to convey a workpiece 200 to a predetermined workstation for machining, and then convey the workpiece 200 back after the workpiece 200 is machined. The transporting device 100 includes a support frame 10, a driving mechanism 30, a first picking mechanism 50, and a second picking mechanism 70. The driving mechanism 30 is mounted on the support frame 10. The first picking mechanism 50 and the second picking mechanism 70 are movably mounted on the support frame 10 via the driving mechanism 30.

The support frame 10 includes a base 11, a first guiding portion 13, and a second guiding portion 15. The base 11 includes a main body 111 and two fixing portions 112. The main body 111 is substantially rectangular and plate-like. Each fixing portion 112 extends from a corresponding end portion of the main body 111. The first guiding portion 13 and the second guiding portion 15 extend along a lengthwise direction of the main body 111, and are substantially parallel to and spaced from each other. In the illustrated embodiment, the first guiding portion 13 is located above the second guiding portion 15.

The driving mechanism 30 is mounted on the base 11 and includes a moving member 31, a rotation shaft 33, and a conveying belt 35. The moving member 31 is mounted on one of the fixing portion 112. The rotation shaft 33 is rotatably mounted on the other fixing portion 112, such that when the conveying belt 35 is stretched between the rotation shaft 33 and the driving shaft 312, the conveying belt 35 is located between the first guiding portion 13 and the second guiding portion 15. The first picking mechanism 50 is fixed to an upper portion of the conveying belt 35, and the second picking mechanism 70 is fixed to a lower portion of the conveying belt 35. The conveying belt 35 is driven by the moving member 31 to move.

Figure 3A:
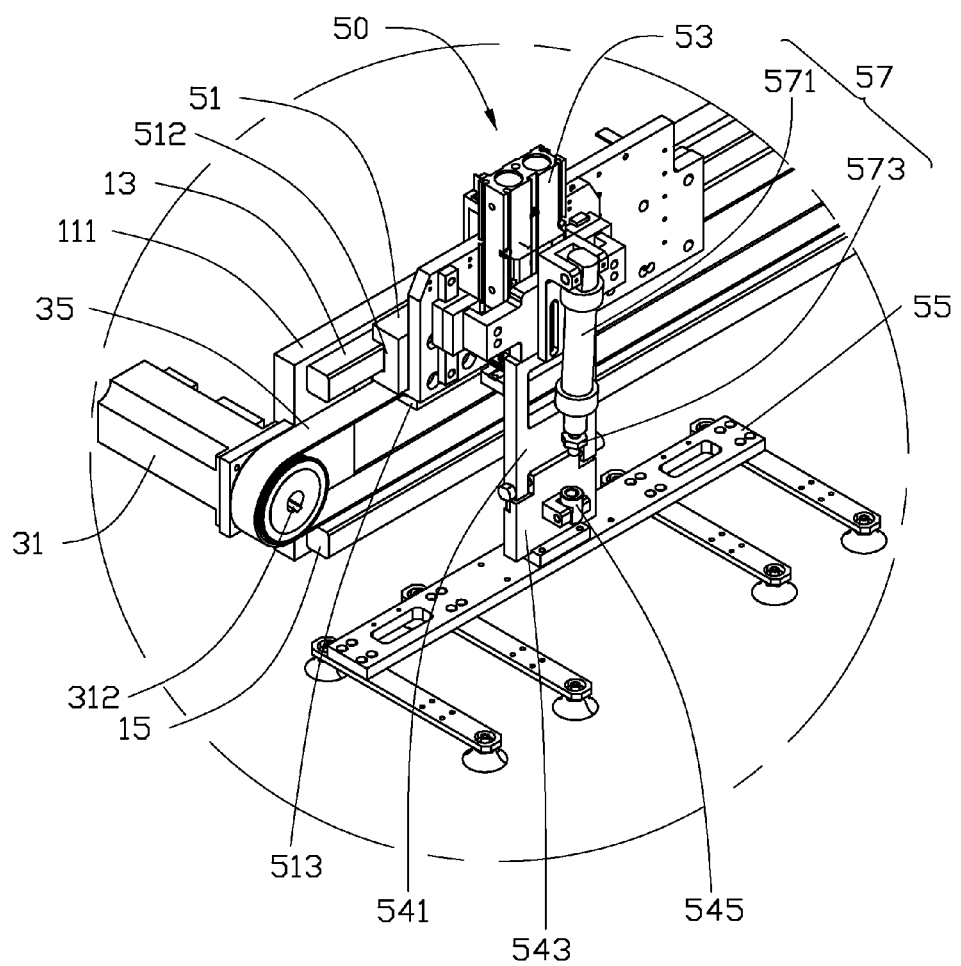
FIG. 3 shows an enlarged view of a circled portion III in FIG. 2.
Figure 3B:
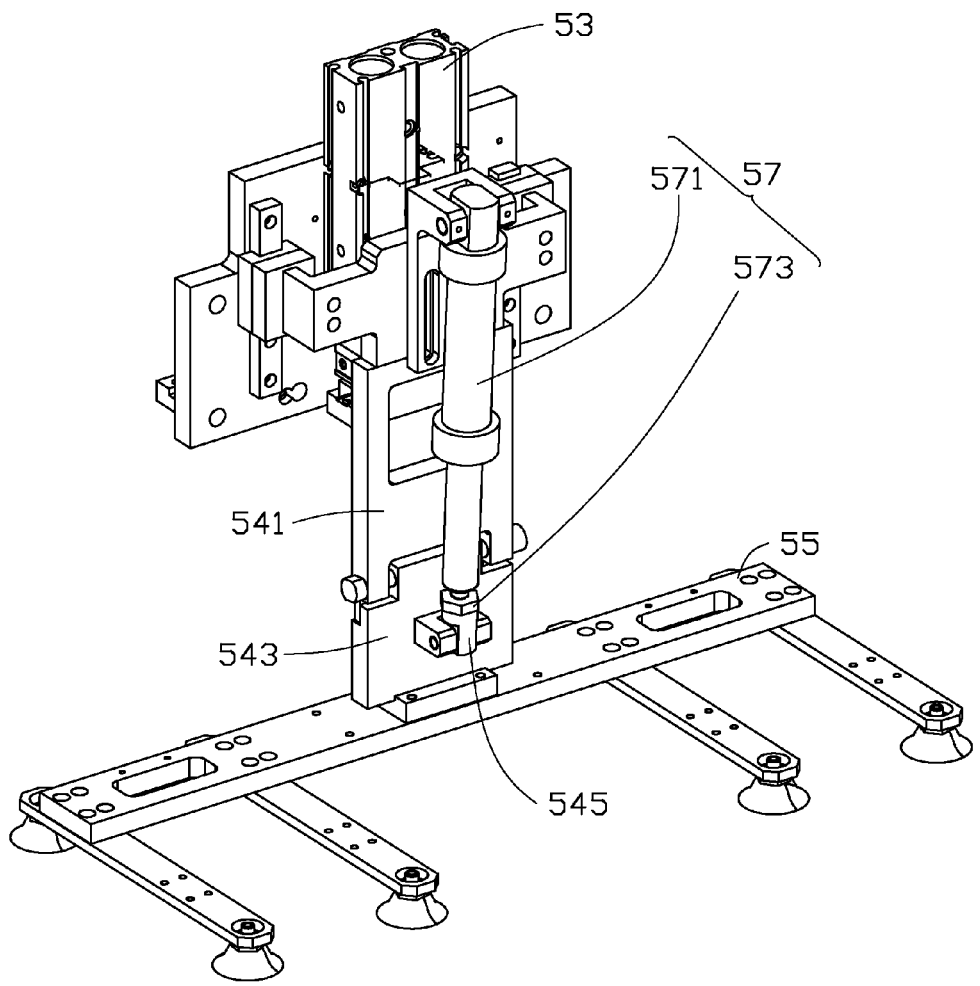
Figure 3C:
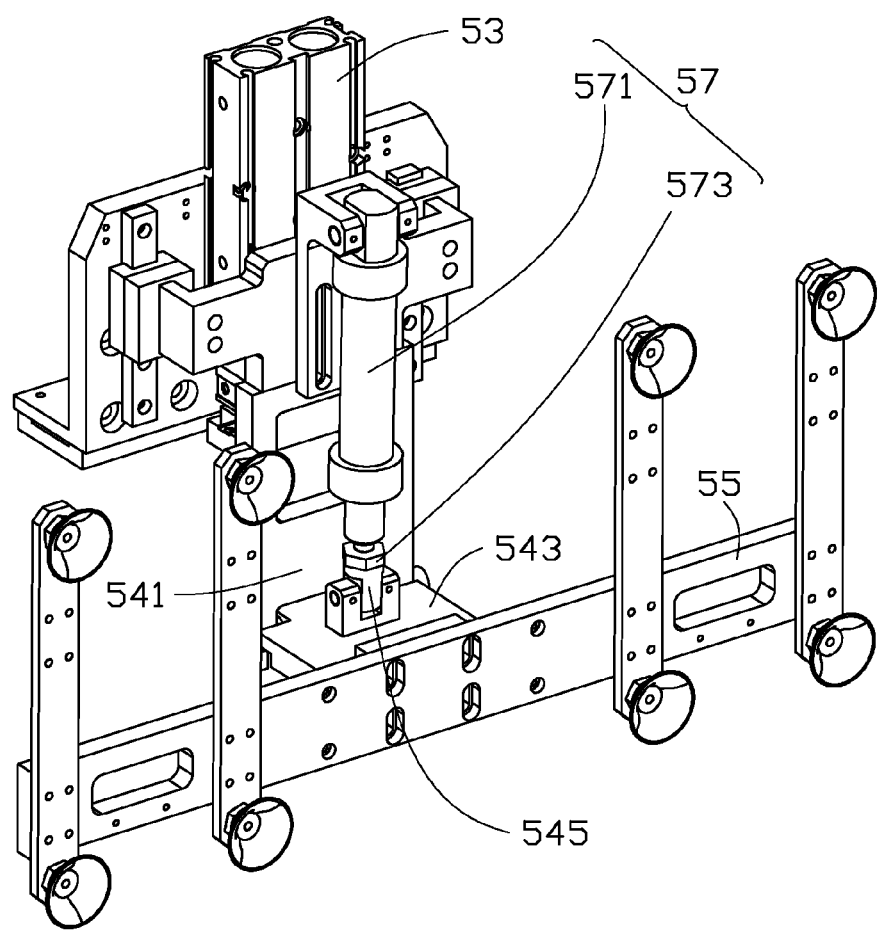

FIG. 3 shows that the first picking mechanism 50 is slidably mounted on the first guiding portion 13 and connected to the conveying belt 35. The first picking mechanism 50 includes a first sliding member 51, a first driving member 53, a hinge member 54, a first picking member 55, and a second driving member 57. The first sliding member 51 defines a first sliding groove 512. The first sliding groove 512 slidably receives the first guiding portion 13, so that the first sliding member 51 is slidable along the first guiding portion 13. A bottom portion of the first sliding member 51 includes a first fixing portion 513. The first fixing portion 513 is fixed to the conveying belt 35. The first sliding member 51 is slidable along the first guiding portion 13 and driven by the conveying belt 35. The first driving member 53 is mounted on one side of the first sliding member 51.

The hinge member 54 includes a hinge portion 541, a first connection portion 543, and a second connection portion 545. The hinge portion 541 is connected to and driven by the first driving member 53. The first connection portion 543 is rotatably connected to the hinge portion 541. The second connection portion 545 is rotatably connected to the first connection portion 543. A rotation axis of the first connection portion 543 relative to the hinge portion 541 is substantially parallel to a rotation axis of the second connection portion 545 relative to the first connection portion 543. The first picking member 55 is fixed to a side of the first connection portion 543 opposite from the hinge portion 541. The second driving member 57 is mounted on the hinge portion 541, and includes a driving main body 571 and a driving portion 573 connected to the driving main body 571. The driving main body 571 is rotatably mounted on the hinge portion 541. The driving portion 573 is driven by the driving main body 571 to telescope, and faces the second connection portion 545. The driving portion 573 latches with the second connection portion 545 when the hinge portion 541 is driven by the second driving member 57 to move toward the second connection portion 545. When the driving portion 573 is moved away from the second connection portion 545, the first connection portion 543 is rotated relative to the hinge portion 541, and the second connection portion 545 is rotated oppositely relative to the first connection portion 543, such that the first picking member 55 is rotated above the second guiding portion 15. Because the first connection portion 543 rotates with a stable rotation radius, and the second connection portion 545 rotates oppositely with a changeable rotation radius, the driving main body 571 may rotate slightly accordingly.

Figure 4:
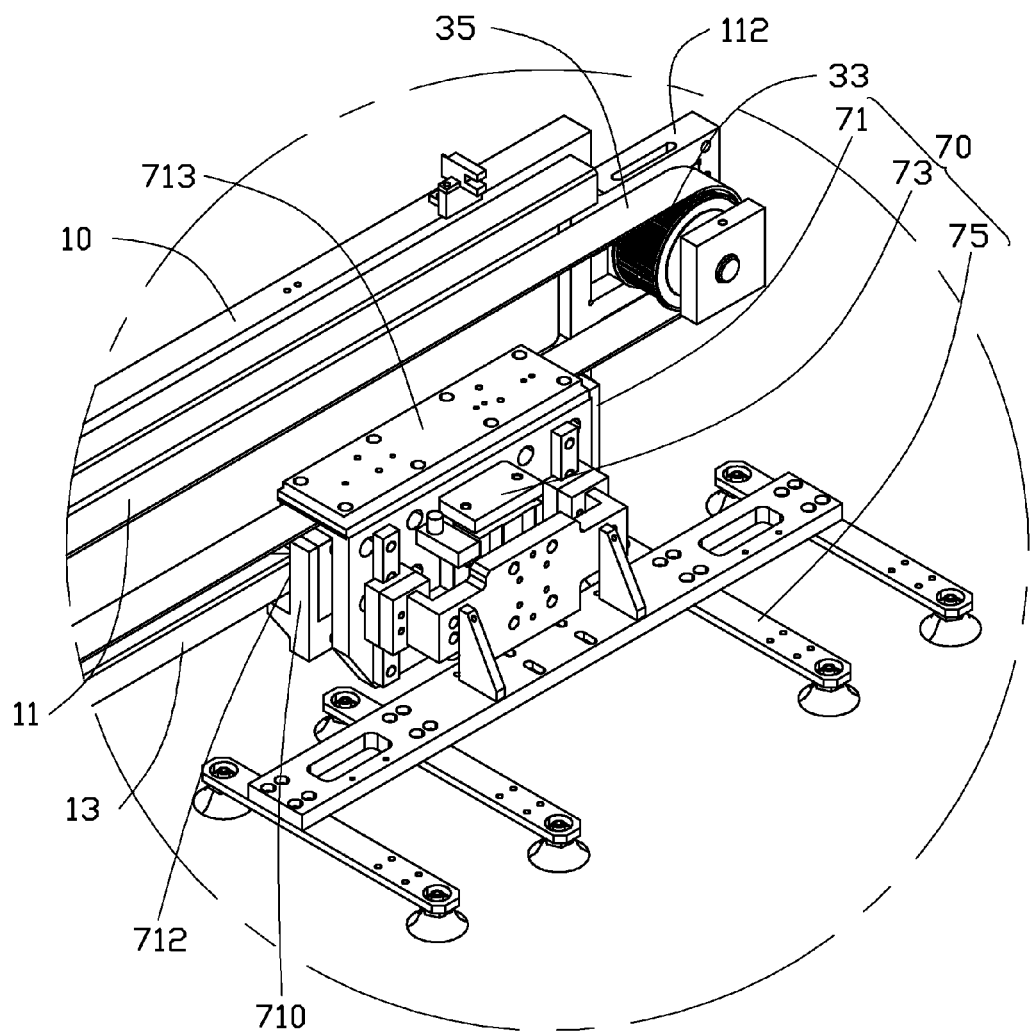
FIG. 4 shows an enlarged view of a circled portion IV in FIG. 2.

Referring to FIG. 4, the second picking mechanism 70 is slidably mounted on one end portion of the second guiding portion 15 away from the first picking mechanism 50, and fixed to the conveying belt 35. The second picking mechanism 70 includes a second sliding member 71, a third driving member 73, and a second picking member 75. The second sliding member 71 includes a main body 710 and a second fixing portion 713 located on a top portion of the main body 710. The main body 710 defines a second sliding groove 712. The second sliding groove 712 slidably receives the second guiding portion 15, so that the second sliding member 71 is slidable along the second guiding portion 15. The second fixing portion 713 is fixed to the conveying belt 35, such that the second sliding member 71 is driven by the conveying belt 35 to move. The third driving member 73 is mounted on a side of the main body 710 away from the second sliding groove 712. The second picking member 75 is connected to the third driving member 73, such that the second picking member 75 can move to the workpiece 200 when the third driving member 73.

In an illustrated embodiment, the first picking member 55 and the second picking member 75 includes suction cups for picking up the workpiece 200. In other embodiments, the first picking member 55 and the second picking member 75 can include other structures for picking up the workpiece 200. For example, if the workpiece 200 is magnetic, the first picking member 55 and the second picking member 75 can be magnetic. If the workpiece 200 is easy to be grasped, the first picking member 55 and the second picking member 75 can be graspers. In other embodiments, the first driving member 53, the second driving member 57, and the third driving member 73 can each be telescopic cylinders.

In use, the conveying belt 35 is driven by the moving member 31 to move, and the first sliding member 51 slides along the first sliding portion 13. Simultaneously, the second sliding member 71 slides along the second sliding portion 15. The first driving member 53 moves toward a first workpiece 200 to be machined, and the first picking member 55 picks up the first workpiece 200. As the first driving member 53 moves toward the first workpiece 200, the driving portion 573 latches with the second connection portion 545. As the driving portion 573 retracts, the first connection portion 543 and the first picking member 55 are rotated relative to the second connection portion 545, and the first picking member 55 is rotated above the second guiding portion 15. The third driving member 73 moves toward a second workpiece 200 that has already been machined, and the second picking member 75 picks up the second workpiece 200. The conveying belt 35 moves the first workpiece 200 to a station to be machined, and simultaneously moves the second workpiece 200 to be unloaded.

Because the first picking member 55 is rotated relative to the second connection portion 554, so that the first picking member 55 is located above the second guiding portion 15, the second picking mechanism 70 does not cross paths with the first picking mechanism 50.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A transporting device, comprising:
   a support frame;
   a driving mechanism mounted on the support frame;
   a first picking mechanism comprising:
   a first sliding member slidably mounted on the support frame driven by the driving mechanism,
   a first driving member mounted on the first sliding member,
   a hinge member comprising a hinge portion driven by the first driving member, a first connection portion rotatably connected to the hinge portion, and a second connection portion rotatably placed on the first connection portion,
   a second driving member mounted on the hinge portion of the hinge member and comprising a driving portion, the driving portion being adapted to telescope and selectively latch with the second connection portion, such that the first connection portion being rotatable relative to the hinge portion driven by the driving portion, and
   a first picking member fixed to the first connection portion; and
   a second picking mechanism mounted on the support frame below the first picking mechanism and driven by the driving mechanism.

2. The transporting device of claim 1, wherein the support frame comprises a base, a first guiding portion, and a second guiding portion, the first guiding portion and the second guiding portion respectively extend from the base along a longitudinal direction of the base, and are parallel to and spaced from each other, the first sliding member is slidably mounted on one end portion of the first guiding portion; the second picking mechanism comprises a second sliding member slidably mounted on one end portion of the second guiding portion away from the first sliding member.

3. The transporting device of claim 2, wherein the first sliding member defines a first sliding groove engaged with the first guiding portion, and the second sliding member defines a second sliding groove engaged with the second guiding portion.

4. The transporting device of claim 3, wherein the second picking mechanism further comprises a third driving member and a second picking member, the third driving member is located on the second sliding member, the second picking member is connected to and driven by the third driving member and is movable relative to the base.

5. The transporting device of claim 4, wherein each of the first driving member, the second driving member, and the third driving member comprises a telescopic cylinder.

6. The transporting device of claim 2, wherein the base comprises a main body and two fixing portions respectively extend from opposite end portions of the main body, the driving mechanism comprises a moving member, a rotation shaft, and a conveying belt, the moving member is mounted on one of the two fixing portions, the rotation shaft is mounted on another one of the two fixing portions, the conveying belt is movably and tangentially wrapped over the rotation shaft and the moving member.

7. The transporting device of claim 6, wherein the conveying belt is located between the first guiding portion and the second guiding portion.

8. The transporting device of claim 7, wherein the moving member comprises a driving shaft, the driving shaft is located opposite to the rotation shaft, the conveying belt is movably and tangentially wrapped over the rotation shaft and the driving shaft.

9. The transporting device of claim 6, wherein the first sliding member is fixed to the conveying belt, and the second sliding member is fixed to the conveying belt.

* * * * *